US006527111B2

(12) United States Patent
Leung et al.

(10) Patent No.: US 6,527,111 B2
(45) Date of Patent: Mar. 4, 2003

(54) PACKAGES FOR INFORMATION STORAGE UNITS

(76) Inventors: Ponny Leung, 12549 Pinehurst St., El Monte, CA (US) 91732; Billy Ha, 12549 Pinehurst St., El Monte, CA (US) 91732

( * ) Notice: Subject to any disclaimer, the term of this patent is extended or adjusted under 35 U.S.C. 154(b) by 0 days.

(21) Appl. No.: 09/839,929

(22) Filed: Apr. 23, 2001

(65) Prior Publication Data

US 2002/0153265 A1 Oct. 24, 2002

(51) Int. Cl.[7] ............................................. B65D 69/00
(52) U.S. Cl. ................... 206/232; 206/308.1; 206/312; 40/722; 40/725
(58) Field of Search ......................... 206/308.1, 309, 206/312, 313, 232, 575, 224, 308.3, 387.13, 387.14, 459.5; 40/703, 722, 723, 725, 779, 786, 788, 789, 798, 799, 312; 229/92.8, 162

(56) References Cited

U.S. PATENT DOCUMENTS

| | | | | |
|---|---|---|---|---|
| 5,232,087 A | * | 8/1993 | Schluger | 206/232 |
| 5,293,994 A | * | 3/1994 | Antik | 206/232 |
| 5,497,876 A | * | 3/1996 | Fleming | 206/232 |
| 5,575,384 A | * | 11/1996 | Saye | 206/232 |
| 5,775,494 A | * | 7/1998 | Taplin | 206/232 |
| 5,794,631 A | * | 8/1998 | Sylvester | 206/232 |
| 5,845,425 A | * | 12/1998 | Leake et al. | 40/124.06 |
| 6,041,998 A | * | 3/2000 | Goldberg | 206/232 |
| D424,434 S | * | 5/2000 | Hoffman | D9/432 |
| 6,070,719 A | * | 6/2000 | Pollock | 206/232 |

* cited by examiner

Primary Examiner—Shian Luong
(74) Attorney, Agent, or Firm—Birch Stewart Kolasch & Birch, LLP; Philip K. Yu

(57) ABSTRACT

A package for information storage units such as video cassettes, CDs, DVDs, 8 mm tapes and the method of making the package. The packaging has a container of substantially the size of the media storage unit to store the unit. Connected to the container is a photograph frame extending from the side of the container to hold a photograph. The photograph frame has a base panel connected with a window panel at a common hinge on one side of the photograph frame. The window panel has an opening at its middle and the photograph frame can be formed by folding the window panel onto the base panel at the common hinge. Additionally, a postcard panel extends from the photograph frame, where the postcard panel is detachably connected to the photograph frame.

9 Claims, 9 Drawing Sheets

PACKAGES FOR INFORMATION STORAGE UNITS

BACKGROUND OF THE INVENTION

The present invention relates generally to improvements for packages typically used for storing, handling and transporting information storage units such as 8 mm or VHS video cassette tapes, audio cassette tapes, compact discs ("CD"), mini discs ("MD"), digital video discs ("DVD"), which consumers use to record their special contents.

FIELD OF THE INVENTION

Information storage units such as video cassettes, CDs, MDs, and DVDs have become an integral part of our everyday life. Memorable events are captured through video cameras and stored on video tapes or 8 mm tapes. Important information is stored on CDs, and our entertainment is conducted through video rentals and DVDs. Naturally all these "media storage units" are handled, stored, transported, or filed away through their packages for protection and identification. Conventional packages for those blank storage units provide uniform design, identification and exterior design dictated by the manufacturer of the tape, CD or DVD.

Conventional packages for these information storage units generally come with the blank storage units, when the storage units are purchased by the consumers. They are generally fairly generic and plain-looking, since they are to blindly appeal to the mass market. When a consumer would like to transport or file the storage units away after recording or copying, many packages look the same, with the exception that one package for a video tape may be marked by the consumer as "Baby's 1$^{st}$ Birthday," while the other package is marked "Trip to Canada 2000." For MDs, they are generally designed and identified the same way. Because of the way the blanks are generically packaged, they do not leave the consumer much freedom to create more special external designs, or personalize the packages for organization or archival purposes.

When there are several similarly looking packages of video tapes on a book shelf, it is inconvenient and cumbersome for a consumer to try to locate a desired package by glancing through all the look-alike packages. The same inconvenience is experienced when one has to look through numerous similar and generic packages to find a desired CD that has been recorded. While proper labeling or handwriting on the packages helps alleviate the pain, it does not completely address the common frustration when a consumer has compiled quite a few collection of recorded CDs or video tapes, all with similarly-looking packages that came with the CD or video tapes upon purchase. As can be appreciated, personalizing the packages makes it easier to organize and to retrieve, not to mention the fulfillment of one's creativity preferences.

It should be pointed out that there are always those specially designed packages for movie video, DVDs, or CDs, which have custom exterior graphics designs of their own. For example, a video movie for "Forrest Gump" is packaged uniquely with the movie theme design, while a video movie for "The Godfather" is packaged with its own movie theme. There is obviously no need for the consumers to further customize them, since they are already fairly unique. Even so, improvements may be incorporated, as will be described in the description that follows, to make them more attractive and provide more utility. More importantly, for those blank video tapes, CDs, 8 mm tapes or DVDs which are to be recorded by the consumers, those are the ones that can use customization and personalization by the consumers to stand out.

Additionally, even as our desktop or laptop computers are increasingly becoming for aesthetically looking than before, not to mention the personalization for the face plates of our mobile phones, the generic and plain design packaging for the CD-ROM, DVD or video tape blanks seems to come from the dark ages. In fact, it is fair to say they have not changed very much since the day when the blanks were first introduced to the market. However, the vendors for such storage units have not caught on to the idea that there are ways to empower consumers to express their individualism or customize or personalize their storage content with very little efforts.

Further, the consumer may use a video camera to record the family's vacation to Washington D.C. When the video tape is completed, it is generally stored in one of those generic-looking packages with a label or marking thereon. This seems like such an anticlimactic finish to an excitement-filled and eye-opening vacation experience. Similarly, a tape recording of the consumer's baby's first birthday should deserve a packaging more attractive and personalized than the generic package with which it comes.

Various kinds of conventional packages are disclosed in numerous U.S. patents and PCT publications. One U.S. Pat. No. 5,232,087, issued to Schluger, discloses a box with panels which can be used as either a greeting card or as a mailer. U.S. Pat. No. 5,860,589, issued to Hsu, discloses a patterned packing box with frames for insertion of cards or advertisements. U.S. Pat. No. 5,174,442, issued to Kurnit, discloses a packaging device for an audio or video cassette tape. The packaging also has one or more tear-off cards which can be removed as desired. U.S. Pat. No. 5,794,631, issued to Sylvester, discloses a decorative gift box which can be used to hold cassettes, CDs or books. U.S. Pat. No. 6,065,599, issued to Lincoln, discloses a video cassette storage sleeve. U.S. Design Patent No. 374,036, issued to Lin, shows a novel design for a card. U.S. Pat. No. 5,662,222, issued to Thayer, discloses an informational media mailer with reply card. U.S. Pat. No. 5,749,463, issued to Collins, discloses a CD package with spines. PCT Patent Publication WO 94/22742 discloses a CD package made from a foldable flat material blank. U.S. Pat. No. 4,433,780 issued to Ellis discloses a greeting card. U.S. Pat. No. 5,469,965 issued to Stearns discloses a video cassette mailer.

Therefore, it would be desirable to provide packages for those media storage units that can be customized based on events, location or simply personal preferences.

It would also be desirable to provide packages for the media storage units that can be used to convey additional information or function compared to those offered by the generic packaging.

SUMMARY OF THE INVENTION

A package for information storage units such as video cassettes, CDs, DVDs, 8 mm tapes and the method of making the package. The packaging has a container of substantially the size of the media storage unit to store the unit. Connected to the container is a photograph frame extending from the side of the container to hold a photograph. The photograph frame has a base panel connected with a window panel at a common hinge on one side of the photograph frame. The window panel has an opening at its middle and the photograph frame can be formed by folding the window panel onto the base panel at the common hinge.

Additionally, a postcard panel extends from the photograph frame, where the postcard panel is detachably connected to the photograph frame.

BRIEF DESCRIPTION OF THE INVENTION

DETAILED DESCRIPTION OF THE INVENTION

A package for information storage units and the method of making such package is disclosed. The invention can be applied for use with a video cassette, DVD, CD, 8 mm tape or other information storage units. For the purpose of simplicity, a video cassette tape is referred to in the following description as the "information storage unit." However, it would be apparent to those skilled in the art that other units, such as CDs, MDs, DVDs or 8 mm tapes can readily be used in accordance with the teaching of the present invention.

Figure 1:
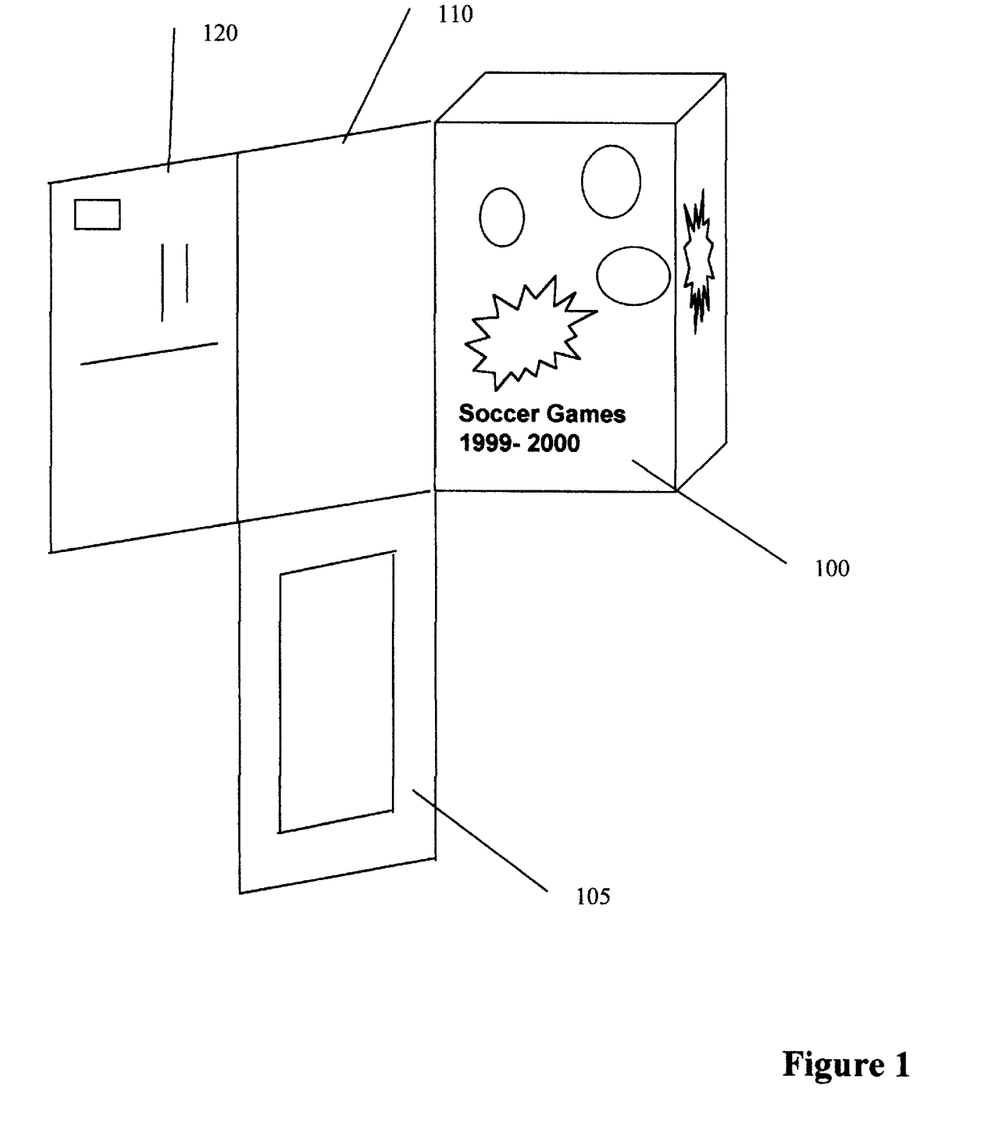
FIG. 1 shows one embodiment of the present invention with photo frame and postcard.

FIG. 1 illustrates one embodiment of the present invention, which can be made by cutting from cardboards with or without external graphics or designs. Such material is quite common in the industry of packaging for video cassettes, audio cassettes, CDs, DVDs or 8 mm tapes. As shown in FIG. 1, container 100 is substantially the size of the storage unit it is intended for, e.g. a video cassette tape. Container 100 is used to retain the video cassette tape by itself along, or with its plastic box, depending on the size of container 100. A multi-piece panel extends from the hinge of one side of container 100, forming photo frame 105, 110 and postcard 120. As shown in FIG. 1, panel 105 can be folded upward, joined and sealed at the top with panel 110 to form a frame for a photo. Panel 105 has a cut-out section in the middle to form the window of the photo frame. Postcard 120 can be readily detached from the panel 110, and mailed away by the consumer.

Moreover, the package as shown in FIG. 1 can be made with any exterior designs or graphics. A resort hotel may sell the package to its visitors in laid-open cardboards or in ready-made packages, decorated with the local scenery pictures. An NFL sports team can sell the packages decorated with action shots or players' photos. The consumer, upon purchase, will have packaging device her video tapes recorded at the hotel or during the game. A package as such is aesthetically pleasing, as well as making it easy to distinguish the package from other generic packages. Additional themes such as birthday, wedding, graduation, anniversary, Christmas, Thanksgiving, or New Year's Party can be applied to the packages for the consumers' benefit.

It should be pointed out that those skilled in the art will appreciate that the multi-piece panel 105, 110, 120 may contain multiple postcards and photo frames in various combinations. Such enhanced features make container 100 very attractive to users, especially if the cardboard has attractive outside designs as mentioned above. Container 100 can be used to store the video tape recording the consumer's vacation or memorable events. Photo frame, formed by folding and joining panels 105, 100, can be used to hold a picture taken during the vacation, while postcard 120 can be detached and mailed to a friend elsewhere. Photo frame 105, 110 can be further folded back to the top face of container 100 for storage and handling. Now, container 100 is no longer just a video box; rather it is more personalized and custom-made, by virtue of its additional features and external graphics.

Note that while container 100 is shown as a container for a video cassette, it should be recognized that it can be modified to retain CDs, MDs, 8 mm tapes, provided that additional padding or cushioning is used to secure the storage units which can be smaller than the container 100. However, it is preferable to make containers generally the same size as the storage units they are intended for, so that it would be easier for the consumers to buy and readily use the package.

Figure 2:
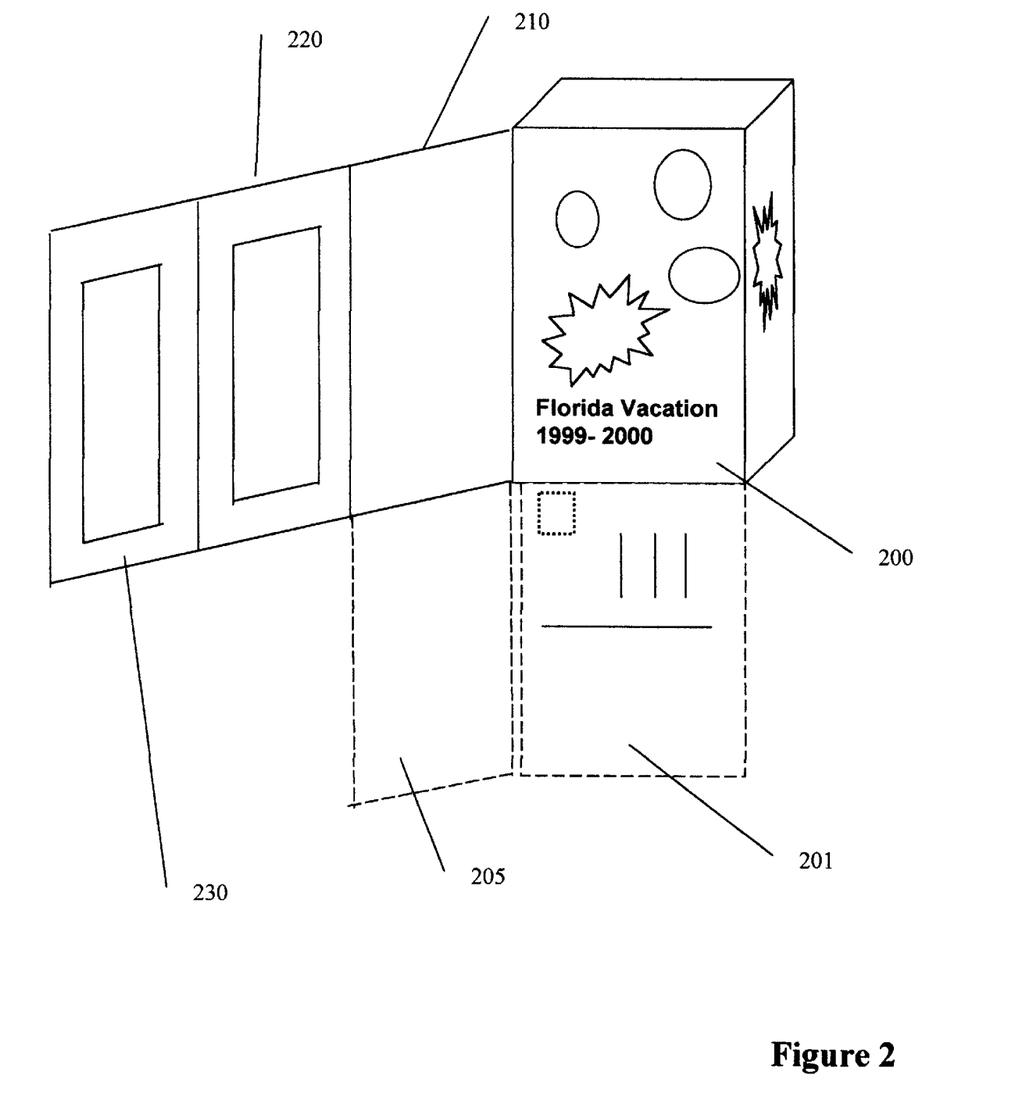
FIG. 2 shows another embodiment of the present invention with photo frame and postcard.

FIG. 2 shows another embodiment of the present invention. Container 200 can be made to be about the size of a video cassette, or whichever information storage unit it is intended for. Postcard 201 is detachably connected to the bottom hinge of container 200. Panel 210, 220 may be the photo frame when folded together, and panel 220 has a cut-out middle portion to form the window of the photo frame. Alternatively, panel 230 can have a cut-out portion and can be folded to panel 220 to form a photo frame. If both panel 220 and 230 are cut out at the middle, they form a double-side photo frame.

If provided, panel 205 (shown in dotted line) can be another postcard or used as a frame to be folded back to panel 210. This package as a whole is constructed from one sheet of cardboard with a common decorative design such as scenic pictures, sports teams, designer wedding scenes, etc. As such, any video cassette tape enclosed with the package in accordance with the present invention is more attractive, and yet provides more functional enhancements than the conventional packages.

Figure 3:
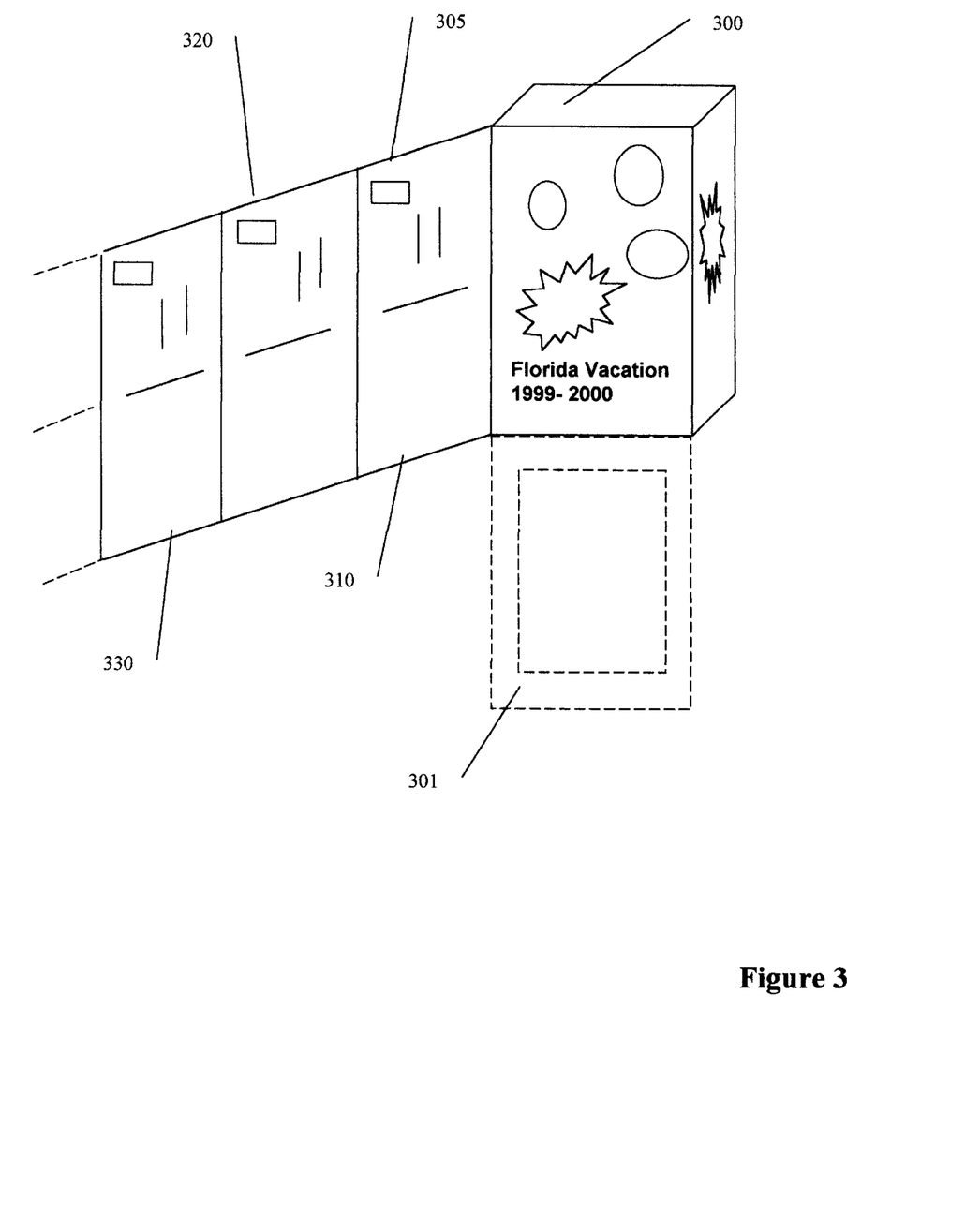
FIG. 3 shows yet another embodiment of the present invention with photo frame and multiple postcards.

FIG. 3 shows a package with container 300. Panel 301 (shown in dotted line) with a cut-out portion can form a window for a photo frame, if folded back to the top face panel of container 300. A multiple panel extension 310, 320, 330 is detachably connected to another hinge of container 300 to form multiple postcards. The hinges of the extension are perforated to make detachment easier, if needed.

It should be appreciated by those skilled in the art that frame 301 and postcards 310, 320, 330 can be connected to container 300 at any hinge of container 300, provided obviously some combinations are more suitable for manufacturing because of space configurations. However, since container 300 is to be constructed by a single sheet of cardboard, different arrangements or combination may yield more or less packages from a single sheet of cardboard. Those skilled in the art can readily determine the optimal arrangement based on how the material is to be used.

Figure 4:
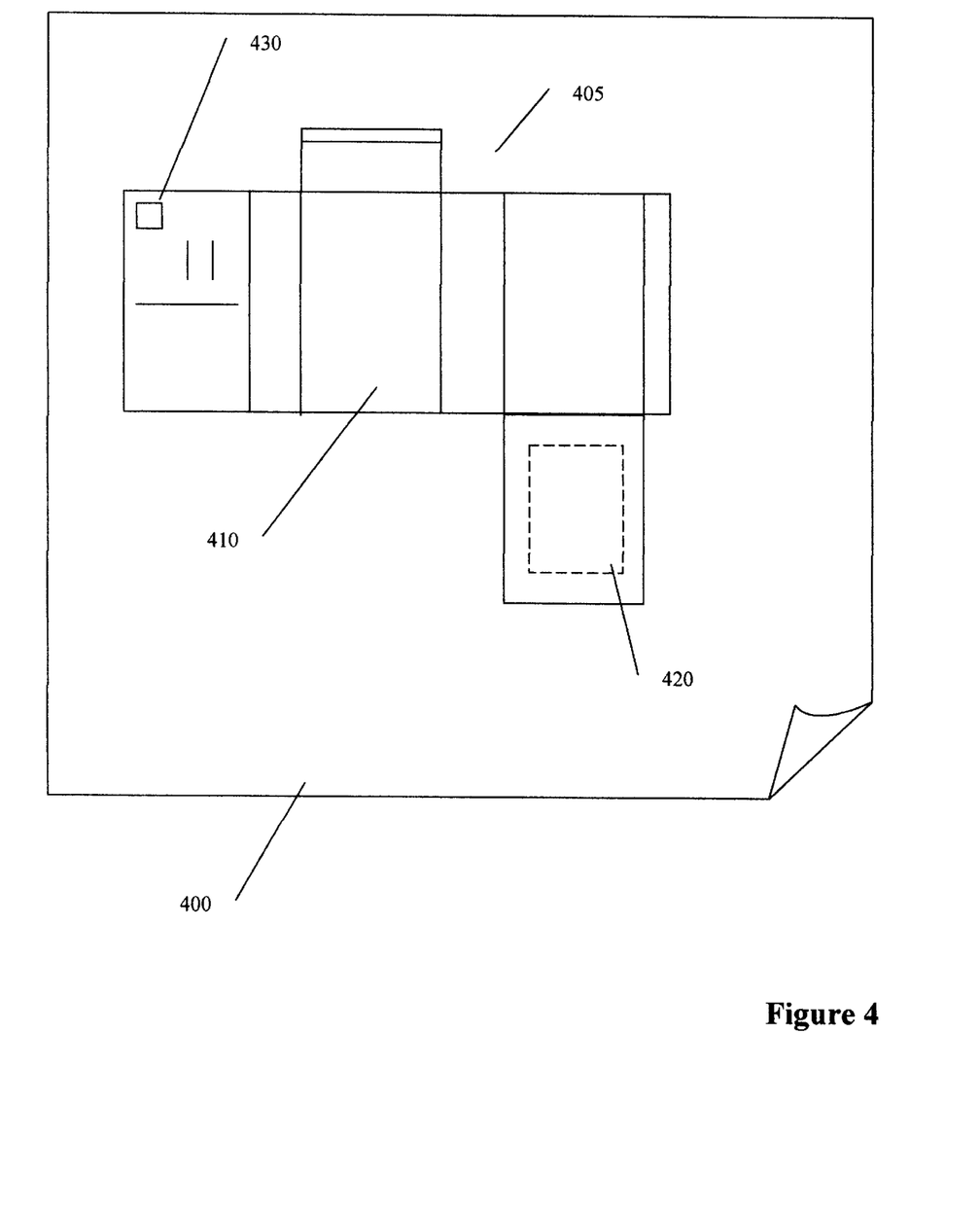
FIG. 4 shows an uncut cardboard with the outline of a container with postcard and photo frame printed thereon.

FIG. 4 shows a cardboard material 405, where the outline of the laid-flat container 405 is printed. Consumers can purchase this material 400 and make their own package with photo frame(s) and postcard(s) by cutting along the outline, which preferably has been pre-punched for easy separation. Merchants, such as resort hotels, gift shops, NFL teams or photo shops, may also purchase the material with their desired exterior designs or graphics for re-sale to consumers. As shown, panel 410 is the bottom panel of container 405. Connected to the bottom panel and side panel is panel 430, which is the postcard. Panel 420, when its middle is cut out and folded back, becomes the photo frame.

The outline of the package can be traced onto the material using a template, which defines the outline. With the template, users can then apply the design to any cardboard material, cut out the design and assemble their own packages. The template provides flexibility at both the manufacturing end and the consumer end, since the cardboard is not cut until the consumer decides which package she desires, whether it is for a video cassette, CD, MD, DVD or 8 mm cassette.

Figure 5:
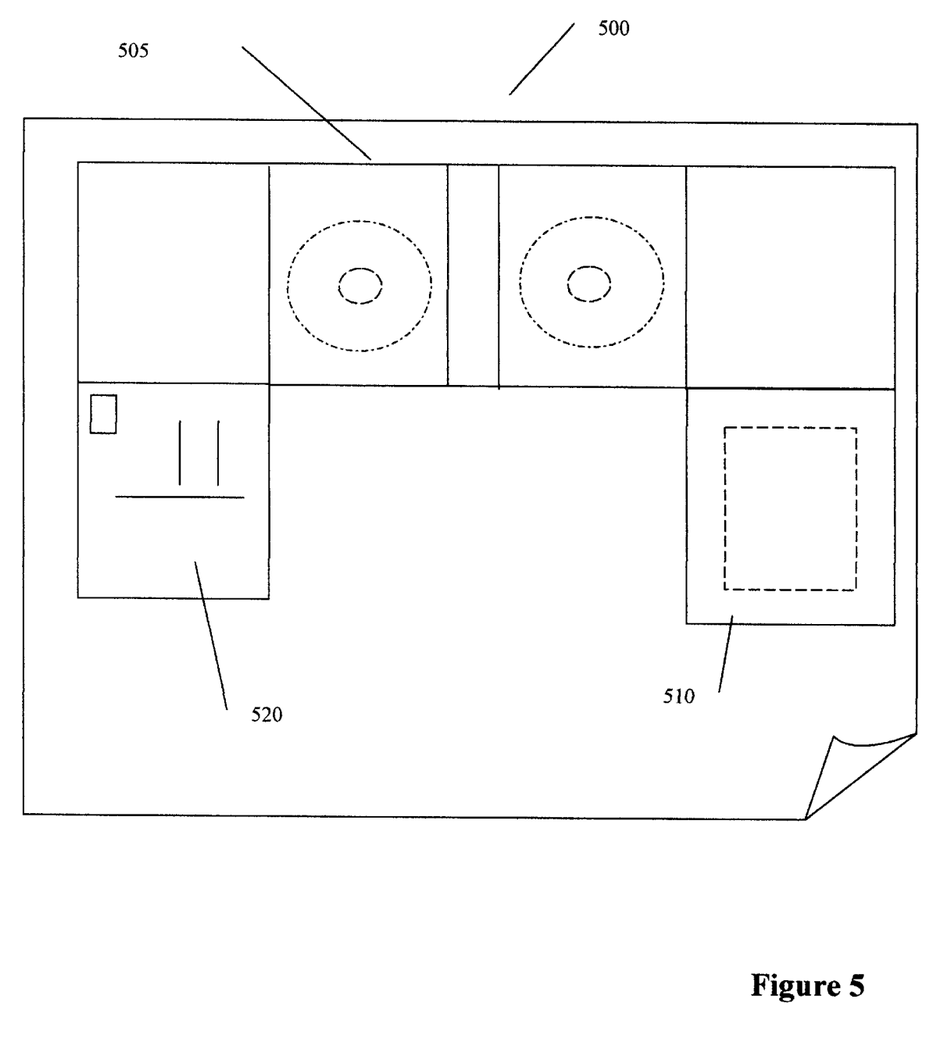
FIG. 5 shows another uncut cardboard with outline of a container printed thereon.

FIG. 5 shows another embodiment of the present invention of the cardboard 500, with the outline of the package 505 printed or marked thereon. As with the cardboard mentioned above, the other side of the cardboard (not shown) can be decorated with aesthetically pleasing or theme-based designs. Panel 510 with a cut-out portion can be the photo frame. Panel 520 is the postcard. Note that this container 505 can be sized to fit a CD, i.e. more square-like than the box for a video cassette. Those skilled in the art, of course, can elect to print the outline of an opened-up container for whatever storage units that are intended.

Figure 6:
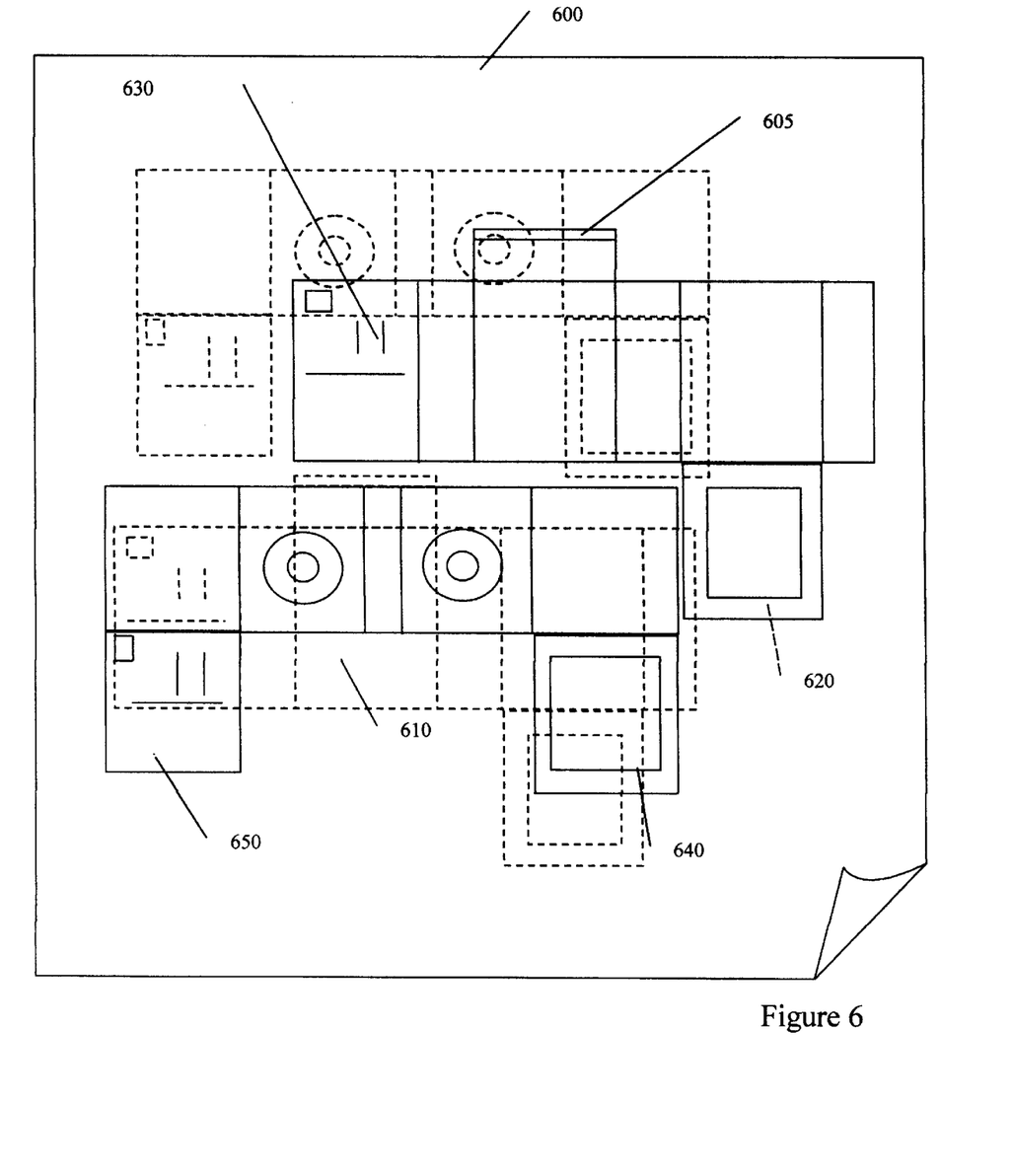
FIG. 6 shows another uncut cardboard with outlines of multiple containers printed thereon.

FIG. 6 shows another sheet 600 of outlines of multiple packages, such as those for 8 mm tapes. A larger package 605, for a video cassette, can be assembled to contain a photo frame 620 and postcard 630. A smaller package 610 can be assembled to contain a photo frame 640 and postcard 650. What the user needs to do is to use two templates to trace the outline for both on the cardboard 600 and cut them out.

It should be pointed out that the cardboard may have multiple overlapping outlines, for video package or DVD package, on the cardboard, differentiated by color or dashes of the lines. The user simply chooses the desirable package to cut according to the outline. A cardboard sheet may be marked to accommodate different combinations, overlapping or not: one video cassette package, or 2 CD packages plus a MD package. This flexible, one cardboard fits all, approach minimizes what the vendor has to stock, while allowing flexibility for the users.

Figure 7:
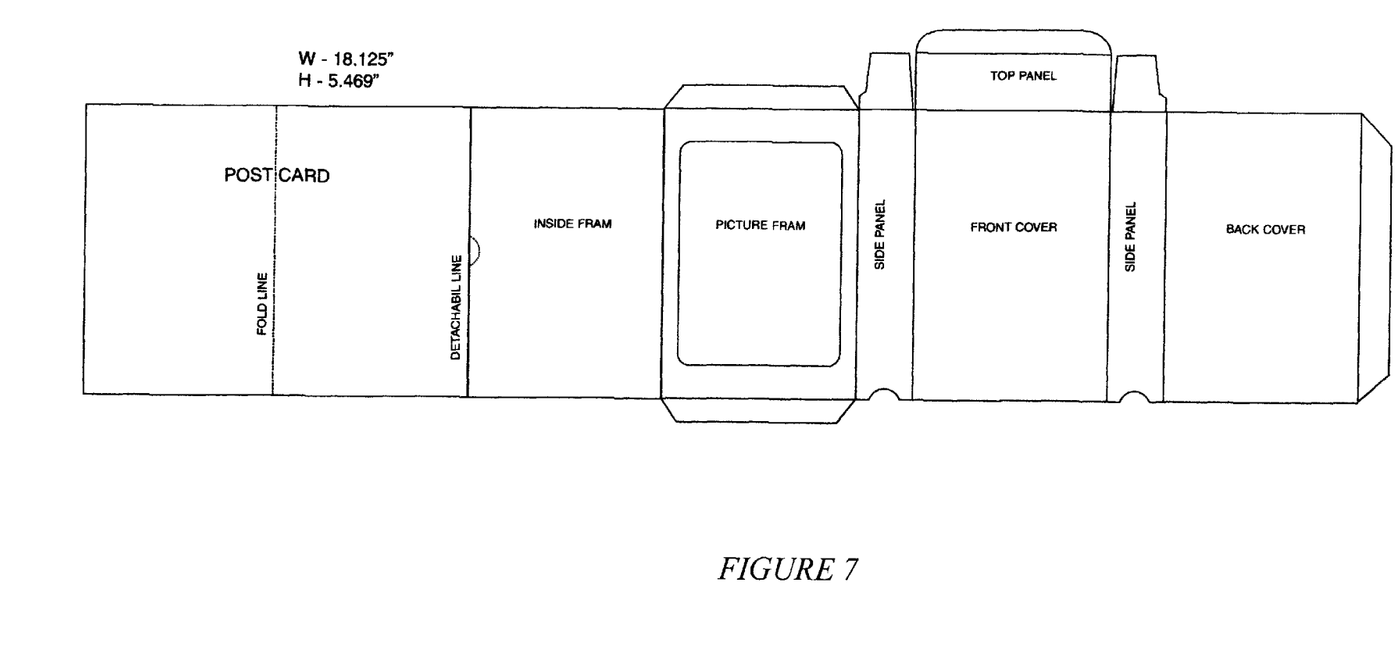
FIG. 7 shows a package die board for 8 mm video tapes.

FIG. 7 illustrates a layout of a die board for an 8 mm tape. For manufacturing, a die board can be made to cut out cardboards according to this layout. Since the dimension for the 8 mm tape is smaller than a standard postcard, panels 701 and 702 will form the postcard, which can be detached from panel 703 at the detachable line. Panels 703 and 704 form the photo frame, while panels 705 and 706 form the front and back covers. The line between panels 701 and 702 is marked a "fold" line, because a postcard is produced, after the panels 701 and 702 are unfolded from their storage position. On the other hand, the line between panel 702 and 703 is marked "detachable line" since the postcard is to be detached from the photo frame for mailing.

Figure 8:
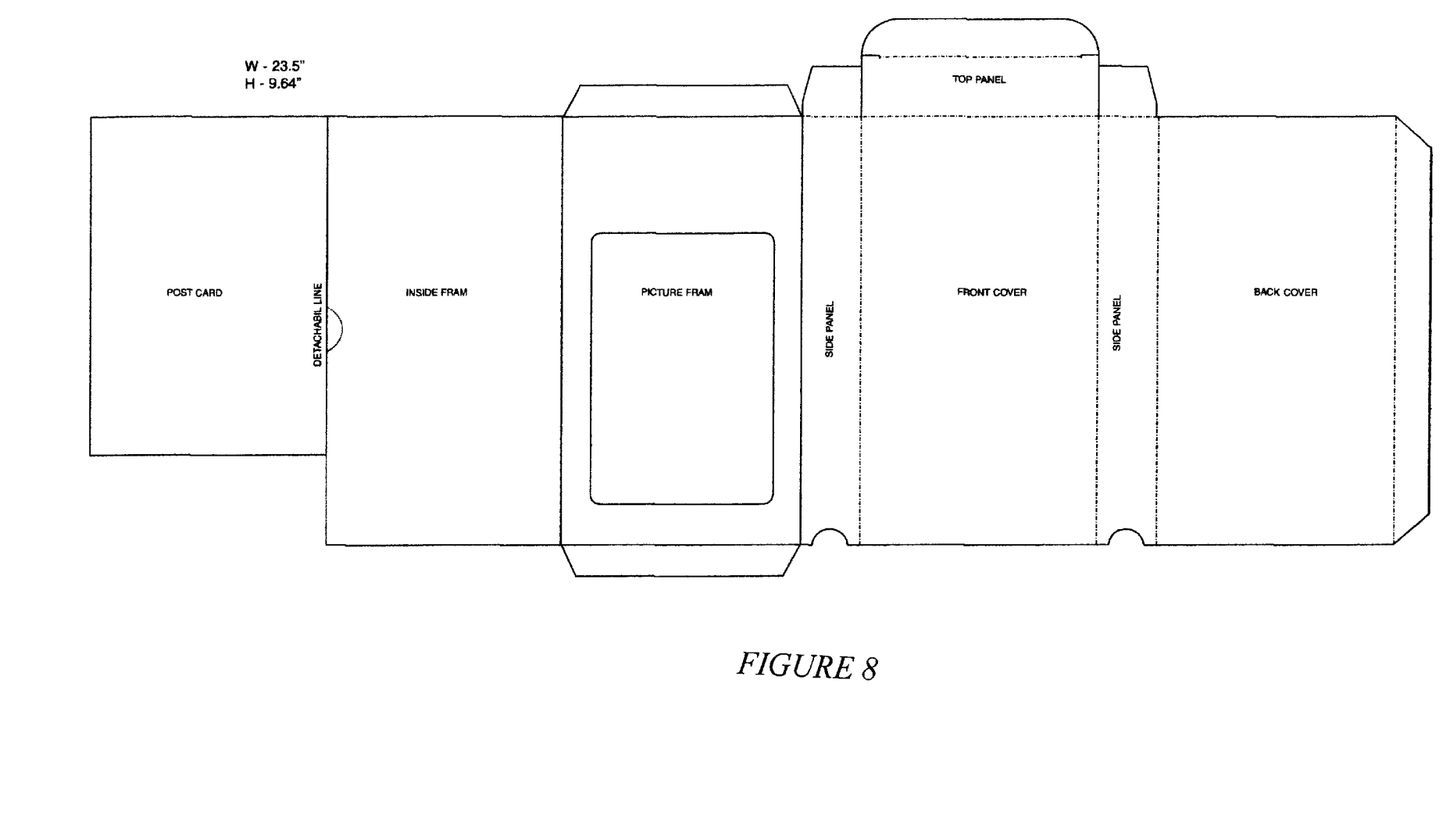
FIG. 8 shows a package die board for VHS tapes.

FIG. 8 shows a layout of a die board for a VHS tape. Here, panel 801 becomes the postcard on its own. Panels 802 and 803 form the photo frame. Panels 804 and 805 form the front and back covers.

Figure 9:
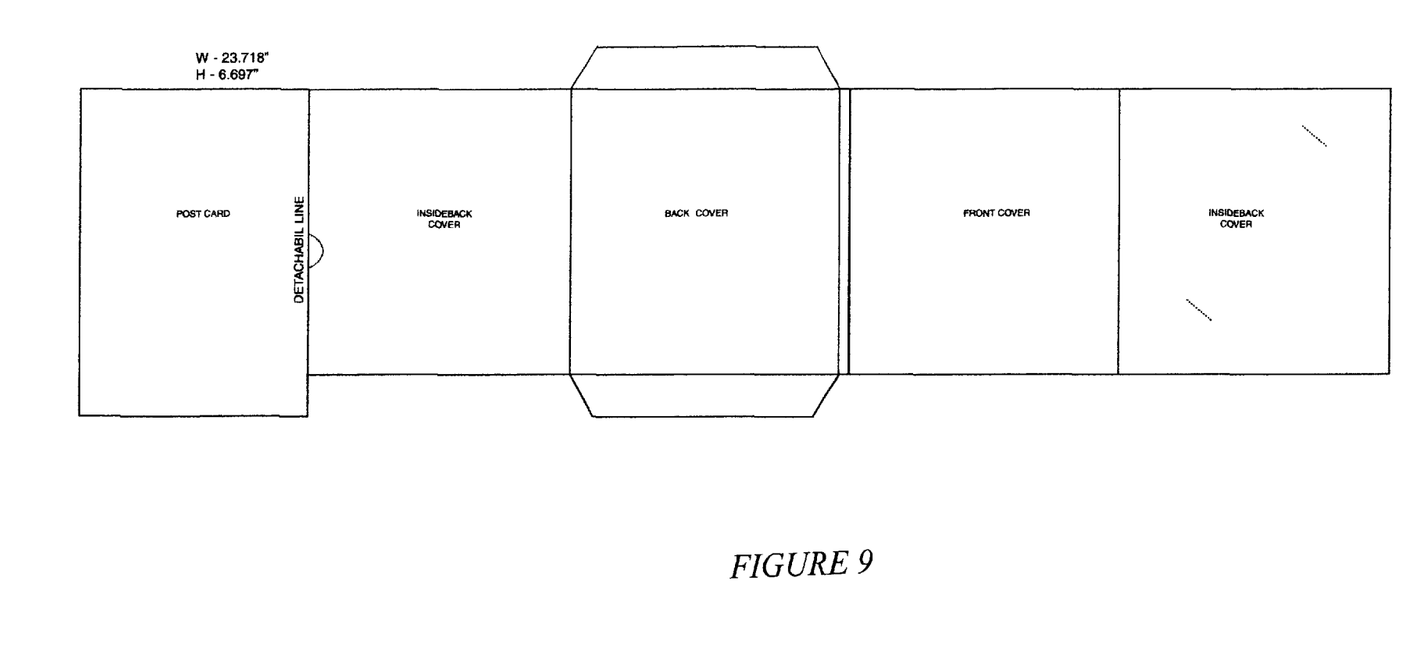
FIG. 9 shows a package die board for CDs.

FIG. 9 shows a layout of a die board for a CD or DVD. A post card is 30 formed by detaching panel 901 from panel 902. A pair of slits on panel 905 can be used to hold a picture at its opposite corner.

The invention may be embodied in other specific forms without departing from the spirit or essential characteristics thereof The present embodiments are to be considered in all respects as illustrative, and not restrictive. The scope of the invention is therefore, indicated by the appended claims rather than by the foregoing description, and all changes which come within the meaning and range of equivalency of the claims are to be embraced within their scope.

We claim:

1. A package for storing at least one media storage unit, comprising:

a container of a predetermined size to store the unit, the container having a first side panel and a second side panel;

at least one photograph frame extending from the first side panel of the container to hold a photograph, said at least one photograph frame comprising a base panel connected with a window panel at a common hinge on one side of the photograph frame, the window panel having an opening at its middle, the photograph frame being formed by folding the window panel onto the base panel at the common hinge;

at least one postcard panel extending from the photograph frame, the postcard panel being detachably connected to the photograph frame.

2. A package of claim 1, further comprising:

a mailing label panel further extending from the second side panel of the container, the mailing label having adhesive applied to one edge of the mailing label panel so that the mailing label, when folded back to enclose the container, adheres to the edge of the container.

3. A method of making a personalized package for information storage units, comprising the steps of:

a) providing a cardboard suitable for use as packages;

b) selecting a graphics design to decorate at least one side of the cardboard;

c) printing the design onto at least one side of the cardboard;

d) using a template to define a package, the package comprising:

a container of a predetermined size to store the unit, the container having a first side panel and a second side panel;

a photograph frame extending from the first side panel of the container to hold a photograph, the photograph frame comprising a base panel connected with a window panel at a common hinge on one side of the photograph frame, the photograph frame being formed by folding the window panel onto the base panel;

at least one postcard panel extending from the photograph frame, the postcard being detachably connected to the photograph frame;

e) marking the cardboard using the template to define the package;

f) cutting the cardboard based on the template;

g) folding the cardboard that is cut out and assembling into the package.

4. The method of claim 3, wherein the package further comprises:

a mailing label panel further extending from the second side panel of the container, the mailing label having adhesive applied to one edge of the mailing label panel so that the mailing label, when folded back to enclose the container, adheres to the edge of the container.

5. A cardboard kit for making a package for information storage units, comprising:

a cardboard;

a plurality of overlapping outlines printed onto the cardboard, each outline being different in characteristics from other outlines, each outline defining a layout for a package being laid-open, the package comprising:

a container of a predetermined size to store the unit, the container having a first side panel and a second side panel;

at least one photograph frame extending from the first side panel of the container to hold a photograph, said at least one photograph frame comprising a base panel connected with a window panel at a common hinge on one side of the photograph frame, the photograph frame being formed by folding the window panel onto the base panel.

6. The kit of claim 5, wherein the package further comprises:

a plurality of postcard panels extending from the side panels, each of the postcard panels being detached connected to each other and to the container.

7. An improved package for a cassette tape, comprising:

a front panel having a first end, a second end and a top end;

a top side panel having a bottom end, said bottom end being hingedly connected to said top end of said front panel;

a first side panel having a first end and a second end, said second end being hingedly connected to said first end of said front panel;

a back panel having a first end and a second end, said second end of said back panel being hingedly connected to said first end of said first side panel;

a second side panel having a first end and a second end, said first end being hingedly connected to said second end of said front panel;

a picture frame panel having a first end and a second end, said first end being hingedly connected to said second end of said second side panel, said picture frame panel having a predetermined center area adapted to be cut out to form a window;

an inside frame panel having a first end and a second end, said first end being hingedly connected to said second end of said picture frame;

a postcard panel having a first end and a second end, said first end being detachably and hingedly connected to said second end of said inside frame panel, said postcard panel being adapted to be detached from said inside frame panel, wherein when said package is closed, said first, second and top side panels are disposed between said front and back panels, wherein said picture frame panel is connected adjacent to said first end of said back cover.

8. The package of claim 7, wherein:

said picture postcard panel having a fold line, parallel to its first end, to allow its second end to be folded toward its first end prior to its use.

9. The package of claim 8, wherein said package having an aesthetically pleasant graphics design on its exterior.

* * * * *